V. O. OGLE.
DISK JOINTER.
APPLICATION FILED MAY 6, 1916.
1,228,695. Patented June 5, 1917.
Fig. 1.
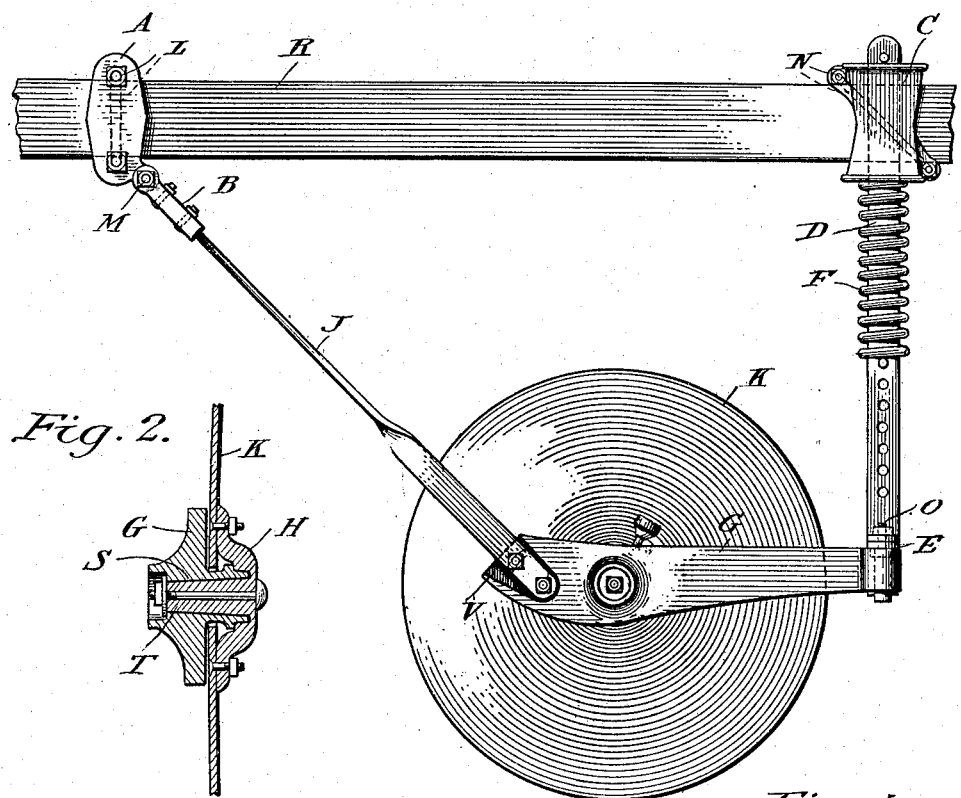
Fig. 2.
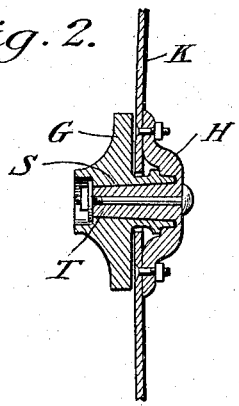
Fig. 3. Fig. 4. Fig. 5.
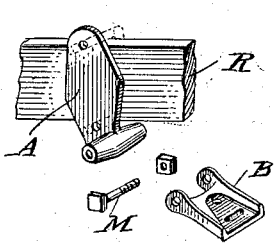 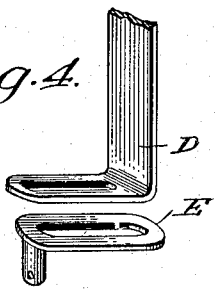
Inventor:
V. O. Ogle

UNITED STATES PATENT OFFICE.

VERN O. OGLE, OF WATERVILLE, WASHINGTON.

DISK JOINTER.

1,228,695.      Specification of Letters Patent.      Patented June 5, 1917.

Application filed May 6, 1916. Serial No. 95,966.

*To all whom it may concern:*

Be it known that I, VERN O. OGLE, a citizen of the United States, residing at Waterville, in the county of Douglas and State of Washington, have invented new and useful Improvements in Disk Jointers, of which the following is a specification.

This invention relates to attachments for gang-plows designed for the purpose of destroying weeds, and the object of the invention is to provide a novel and improved weed destroying attachment by the use of which all trash and weeds are turned under and covered so that they will rot, thereby fertilizing the soil and keeping the field free from weeds.

The object stated is attained by means of a combination and arrangement of parts to be hereinafter described and claimed and in order that the same be better understood reference is had to the accompanying drawing forming a part of this specification.

In the drawing, Figure 1 is a side elevation showing the application of the attachment; Fig. 2 is a vertical section taken through the bearing of the weed cutting element; Fig. 3 is a perspective view of the parts whereby one of the supporting members of the attachment is fastened to the beam of the plow, and Figs. 4 and 5 are perspective views of other attaching devices.

Referring specifically to the drawing, R denotes the beam of a gang-plow to which the weed destroying attachment is applied. The element which destroys the weeds is a rotatable disk K, said disk being concave and having a sharp cutting edge, so that when it is dragged along the ground it enters the latter, and turns the surface of the soil, thus turning all trash and weed seeds to the bottom of the furrow, where they are covered by the plow, so that they will rot, and thus fertilize the soil and keep the field free from weeds.

The following means are provided for supporting the disk K from the beam R:

To one side of the disk K, at the center thereof is fixed a hub H having a spindle T extending from its inner side. The beam R carries a drag-link J which is connected at its lower end to the forward end of a bearing member G located at one side of the disk K and having a bearing opening S in which the spindle T loosely seats so that it may turn therein and allow the disk to rotate. The member G has a hub extension on one side to receive the spindle T. A bolt carried by and passing axially through the spindle T prevents separation of said spindle from the bearing member G, one end of the bolt having a washer which seats against a shoulder formed by a cavity in the outer face of the member G, and said washer being secured by a nut as shown in Fig. 2.

The member G is suspended at its front and rear ends from the plow beam R. The drag-link J connected to the forward end of the member G has bolted or otherwise fixed to its forward end a hinge member B having two laterally spaced ears. To the side of the beam R is fastened by a suitable clamp L, a plate A having below the beam a hinge knuckle which seats between the ears of the member B. A bolt M passes through the hinge knuckle and the ears and completes a pivotal connection between the drag-link J and the plate A. The lower or rear end of the drag-link J is secured by a pair of bolts in a recess V in the outer face of the member G, whereby an adjustable connection is had between said link and member, the adjustment permitting the angle of the link to be varied for long and short plow beams. The pivotal connection between the forward end of the drag-link J and the plow beam permits the member G to rise and fall, so that the disk K may follow inequalities in the surface over which it travels. The rear end of the member G is yieldingly supported by the following means:

To the rear end of the member G is fastened a suspension bar D carried by the beam R. As shown in Fig. 4 the lower end of the bar D has a lateral bend which is slotted and seats on a slotted plate E having a depending stem which seats in an aperture in the member G and is secured therein by a cotter pin or other suitable means as shown in Fig. 1. A bolt O passes through the slots of the members D and E and couples the same. On one side of the beam R is fastened by a suitable clamp N a boxing C having a vertical opening in which the upper end of the bar D loosely and slidably seats, said bar being free to slide up and down in the boxing and also to swing back and forth therein in the direction of the length of the beam R. The downward movement of the bar D in the boxing C is limited by a cross pin carried by the bar and engaging the top of the boxing as shown in Fig. 1. Between the bottom of the boxing and an abutment on the bar D is a coiled spring F. The abutment may be a cross pin seating in one of a vertical series of apertures in the bar D, these apertures being provided for the purpose of permitting the tension of the spring to be adjusted. The spring F forces the disk down into the ground the required depth, and the parts associated with the spring provide a yielding support for the member G so that the disk K may pass over obstructions.

The slots in the parts D and E shown in Fig. 4 extend transversely of the plow and are for the purpose of enabling the disk K to be adjusted sidewise and set in line with the plow point, this adjustment being necessary as some plow beams are not in line with the plow point.

I claim:

1. The combination with a plow beam, of a rotatable weed cutting and turning disk, a bearing member for said disk, a pivoted drag-link carried by the plow beam and connected to the forward end of the bearing member, a suspension bar connected to the rear end of the bearing member, a boxing mounted on the plow beam and having a vertical opening in which the upper end of the suspension bar is slidably mounted, an abutment on the suspension bar, and a spring between the abutment and the boxing.

2. The combination with a plow beam, of a rotatable weed cutting and turning disk, a bearing member for said disk, a pivoted drag-link carried by the plow beam and adjustably connected to the forward end of the bearing member, the adjustment being such that the angle of the drag-link may be changed, and a yielding support for the rear end of the bearing member, said support being carried by the plow beam.

3. The combination with a plow beam, of a rotatable weed cutting and turning disk, a bearing member for said disk, a pivoted drag-link carried by the plow beam and connected to the forward end of the bearing member, a suspension bar depending from the plow beam and yieldingly supported thereby and connected at its lower end to the rear end of the bearing member, said connection being an adjustable one to permit adjustment of the bearing member laterally with respect to the plow beam.

VERN O. OGLE.

Copies of this patent may be obtained for five cents each, by addressing the "Commissioner of Patents, Washington, D. C."